United States Patent
Park et al.

(10) Patent No.: US 7,702,152 B2
(45) Date of Patent: Apr. 20, 2010

(54) NON-LINEAR QUANTIZATION AND SIMILARITY MATCHING METHODS FOR RETRIEVING VIDEO SEQUENCE HAVING A SET OF IMAGE FRAMES

(75) Inventors: Sung-Hee Park, Daejon (KR); Soo-Jun Park, Seoul (KR); Myung-Gil Jang, Daejon (KR); Sang-Kyu Park, Daejon (KR); Chee Sun Won, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1089 days.

(21) Appl. No.: 10/533,385

(22) PCT Filed: Jan. 16, 2003

(86) PCT No.: PCT/KR03/00101

§ 371 (c)(1),
(2), (4) Date: Apr. 28, 2005

(87) PCT Pub. No.: WO2004/040912

PCT Pub. Date: May 13, 2004

(65) Prior Publication Data

US 2006/0013481 A1 Jan. 19, 2006

(30) Foreign Application Priority Data

Oct. 31, 2002 (KR) .................. 10-2002-0067299
Jan. 13, 2003 (KR) .................. 10-2003-0002074

(51) Int. Cl.
*G06K 9/00* (2006.01)
(52) U.S. Cl. .................................. 382/170
(58) Field of Classification Search .................. 382/170
See application file for complete search history.

(56) References Cited

U.S. PATENT DOCUMENTS 6,181,818 B1  1/2001  Sato et al.

(Continued)

FOREIGN PATENT DOCUMENTS

KR  1999-0032789  5/1999

(Continued)

OTHER PUBLICATIONS

Efficient Use of Local Edge Histogram Descriptor, Proceedings ACM Multimedia 2000 Workshops, Nov. 4, 2000, ACM International Multimedia Conference.*

(Continued)

*Primary Examiner*—Bhavesh M Mehta
*Assistant Examiner*—David P Rashid
(74) *Attorney, Agent, or Firm*—Blakely, Sokoloff, Taylor & Zafman LLP

(57) ABSTRACT

A method for constructing a database having digital video data information representing a plurality of video sequence is disclosed. The method includes the steps of: a) partitioning each image frame of each video sequence into L number of sub images; b) generating L number of edge histograms for each image frame; c) normalizing the edge histogram bins to thereby generate M number of normalized edge histogram bins; d) calculating M representative edge histogram bins in order to generate L number of representative edge histograms based on the normalized edge histogram bins; and e) non-linearly quantizing the representative edge histogram bins to generate M number of quantization index values for the each representative edge histogram, to be stored in the database.

17 Claims, 10 Drawing Sheets

U.S. PATENT DOCUMENTS

| | | | |
|---|---|---|---|
| 6,253,201 B1 | 6/2001 | Abdel-Mottaleb et al. | |
| 6,807,298 B1* | 10/2004 | Park et al. | ............ 382/165 |
| 2002/0136454 A1* | 9/2002 | Park et al. | ............ 382/168 |

FOREIGN PATENT DOCUMENTS

| | | |
|---|---|---|
| KR | 10-2001-0002014 A | 1/2001 |
| WO | WO 02/33978 | 4/2002 |

OTHER PUBLICATIONS

Efficient Use of MPEG-7 Edge Histogram Descriptor, vol. 24, No. 1, Feb. 2002.*

"International Organisation for Standardisation Organisation Internationale De Normalisation ISO/IEC JTC1/SC29/WG11 Coding of Moving Pictures and Audio", Soo-Jun Park, Oct. 2002, Shanghai, 6 pages.

"International Organisation for Standardisation, Organisation Internationale De Normalisation ISO/IEC JTC1/SC29/WG11 Coding of Moving Pictures an Audio", Soon Jun Park, Jul. 2002, Klagenfurt, 2 pages.

"Efficient Use of MPEG-7 Edge Histogram Descriptor" by Chee Sun Won, et al.; *ETRI Journal*, vol. 24, No. 1, Feb. 2002; pp. 23-30.

"Efficient Use of Local Edge Histogram Descriptor" by Dong Kwon Park, et al.; *Proceedings ACM Multimedia 2000 Workshops*, XP 001003692, pp. 51-54, Nov. 2000.

"The MPEG-7 Visual Standard Standard for Content Description-An Overview" by Thomas Sikora; *IEEE Transactions on Circuits and Systems for Video Technology*, vol. 11, No. 6, Jun. 2001.

"Core Experiments on MPEG-7 edge histogram descriptor" by Soo-June Park et al.; International Organisation for Standardisation Organisation Internationale de Normalisation, *ISO/IEC JTC1/SC29/WG11*, Coding of Moving Pictures and Audio; XP-002330725, Jul. 2000.

"Query by Image and Video Content: The QBIC System," Flickner, et al., *IEEE Compu8ter*, Sep. 1995, pp. 23-32.

* cited by examiner

VERTICAL

HORIZONTAL

45-DEGREE

135-DEGREE

NON-DIRECTIONAL

NON-LINEAR QUANTIZATION AND SIMILARITY MATCHING METHODS FOR RETRIEVING VIDEO SEQUENCE HAVING A SET OF IMAGE FRAMES

FIELD OF THE INVENTION

This invention relates to a method for retrieving image data; and, more particularly, to a method for constructing a bit-representation of an edge histogram descriptor having reduced bits for a video sequence including a set of image frames and a method for retrieving a video sequence by using the information effectively extracted from the coded representation of the edge histogram descriptor.

DESCRIPTION OF THE PRIOR ART

The Joint Photographic Experts Group (JPEG) is the international standard for still images and the Moving Picture Experts Group-1 (MPEG-1), 2 are for moving pictures. Regarding compressed image information, feature information for each image is to be extracted for applications such as extracting a key frame, image search, browsing or the like.

To extract the feature information, brightness or color histograms are widely used. The brightness and color histograms, respectively, represent relative frequency of brightness and color (red, green or blue) in an image. Especially, various methods of histogram comparison have been recently proposed for searching still images or digital video data that are stored digitally. As the histograms get used for image search and shot boundary detection, it is believed that conventional histograms are to be improved. That is, it is required to adopt a histogram descriptor such as an edge histogram, which can represent the image content more efficiently. Also, the binary representation of the descriptor should be compact and the computational complexity for the similarity matching should be low.

A method of employing color histograms and edge maps for a shot boundary detection is disclosed in U.S. Pat. No. 5,805,733 entitled "Method and system for detecting scenes and summarizing video sequences". Though the method is effective in that color information considering a human visual system is extracted, it does not include extraction of brightness information.

A method according to which color information is received and then indexing is performed by measuring similarity of images using histogram intersection technique is disclosed in an article by M. J. Swain, et al., "Color Indexing", International Journal of Computer Vision, Vol. 7-1, pp. 11-32, 1991. However, this method does not use brightness and edge information and thus accuracy is not guaranteed enough. Also, since the histograms are generated using a discrete quantization technique in the conventional methods, relatively a large number of histogram bins are necessary to make equal performance. Consequently, inefficiency in storage and similarity measurement is caused. In addition, because a feature extraction is performed in terms of pixel conventionally, there is a problem that feature information is restrictively generated.

In the meantime, as the histogram is widely used for image searching, etc., recently, the efficient way of storing histogram information is required. In other words, a histogram bin value is stored in a storage field of fixed size by normalization using linear quantization according to a conventional way to store the histogram. Consequently, this method of the linear quantization to the histogram storage causes a problem as quantity of bits is increased.

The International Organization for Standardization/International Electrotechnical Commission Joint Technical Committee 1 (ISO/IEC JTC1) establishes international standards for a content based multimedia retrieval technique related to the MPEG-7. A content based multimedia includes a moving picture and still images such as a digital video data. The digital video data i.e., a video sequence contains a number of image frames of at least one moving object. For retrieving the video sequence, a motion descriptor for moving object is extracted from the image frames, wherein the motion descriptors contain motion information of the moving objects in the image frames. After extracting the motion descriptor, likelihood between an inquiry video sequence and motion descriptors of video sequence stored in the database is computed. Finally, according to a computed likelihood, a desired video sequence is retrieved.

Generally, a motion trajectory descriptor is widely used as a motion descriptor in the content based multimedia retrieval technique. The motion trajectory descriptor contains information of motion trajectories of moving objects in image frames of the video sequence and the motion trajectories of the moving objects by using a parametric equation based on locations of objects and a speed of moving objects. In a conventional method by using the motion trajectory descriptor, it is hard to represent a "texture video sequence", which has a number of moving objects, such as a video data containing images of a firework or a waterfall. That is, in the texture video sequence, there are great number of moving objects to be represented by using the motion trajectory descriptors. As a result, there is a great computation burden for extracting the great number of the motion trajectory descriptors for great number of moving objects.

Therefore, for effectively retrieval digital video data including the texture video sequence, a new digital video data retrieval method and enhanced description scheme have been demanded.

SUMMARY OF THE INVENTION

It is an object of the present invention to provide a method for constructing a database having image information representing a plurality of video sequence with reduced bits to be stored in the database.

It is another object of the present invention to provide a method for retrieving a corresponding video sequence in response to a query video sequence based on a database with a high retrieval speed and accuracy.

It is still another object of the present invention to provide a method for retrieving a corresponding video sequence including a texture video in response to a query video sequence based on a database with a high retrieval speed and accuracy.

In accordance with one aspect of the present invention, there is provided a method for constructing a database having digital video data information representing a plurality of video sequence, each video sequence having a set of image frames of the digital video data, the method including the steps of: a) partitioning each image frame of each video sequence into L number of sub images, wherein each sub-image is further partitioned into S×T number of image-blocks, L, S and T being positive integers; b) assigning one of 5 number of reference edges to each image-block to thereby generate L number of edge histograms for each image frame, wherein the edge histogram includes the M edge histogram bins and the reference edges include 4 number of directional edges and a non-directional edge; c) normalizing the edge histogram bins contained in each edge histogram by S×T to thereby generate M number of normalized edge histogram bins for the each image frame;

d) calculating M representative edge histogram bins of the each video sequence in order to generate L number of representative edge histograms of each video sequence based on the normalized edge histogram bins of the each image frames; and e) non-linearly quantizing the representative edge histogram bins to generate M number of quantization index values as a second image descriptor for the each representative edge histogram to be stored in the database.

In accordance with another aspect of the present invention, there is provided a method for retrieving a corresponding video sequence having a set of image frames of the digital video data in response to a query video sequence based on a database, the method including the steps of: a) calculating L number of representative edge histograms of the query video sequence as an image descriptor for the query video sequence, wherein each representative edge histogram represents a representative spatial distribution of 5 number of reference edges in sub-images of image frames in the query video sequence, wherein the reference edges includes 4 number of directional edges and a non-directional edge; b) extracting a plurality of image descriptors for video sequences based on digital video data information from the database, wherein each image descriptor for the each video sequence includes L number of representative edge histogram bins for said each video sequence; c) comparing the image descriptor for the query video sequence to said each image descriptor for each video sequences to generate a comparison result; and d) retrieving at least one target video sequence similar to the query video sequence based on the comparison results.

In accordance with still another aspect of the present invention, there is provided a method for extracting an image descriptor for a video sequence, each having a plurality of image frames of the digital video data, the method comprising the steps of: a) selecting a one of the image frames for a target video sequence as a target image frame; b) calculating L×5 number of normalized edge histogram bins to generate L number of edge histograms of the target image frame, wherein the each edge histogram has 5 number of normalized edge histogram bins and represents a spatial distribution of 5 number of reference edges in a sub-image and L is a positive integer, wherein the reference edges include 4 number of directional edges and a non-directional edge; c) selecting a next image frame as a target image frame; d) repeating steps b) and c) until L number of edge histograms of all image frames are calculated; e) calculating a representative edge histogram having L×5 number of normalized edge histogram bins for the video sequence based on the L number of edge histograms of each image frame; f) non-linearly quantizing the L×5 number of normalized edge histogram bins of the representative edge histogram to generate L×5 number of quantization index values for the digital video data as the image descriptor for the video sequence; and g) storing the L×5 number of quantization index values to the database.

BRIEF DESCRIPTION OF THE DRAWINGS

Other objects and aspects of the invention will become apparent from the following description of the embodiments with reference to the accompanying drawings, in which:

FIG. 4 is an explanatory diagram demonstrating an image-block partitioned into 4 sub-blocks each of which filter coefficients are assigned to;

DETAILED DESCRIPTION OF THE PREFERRED EMBODIMENTS

Hereinafter, preferred embodiments in accordance with the present invention will be described in detail referring to the accompanying drawings.

Figure 1A:
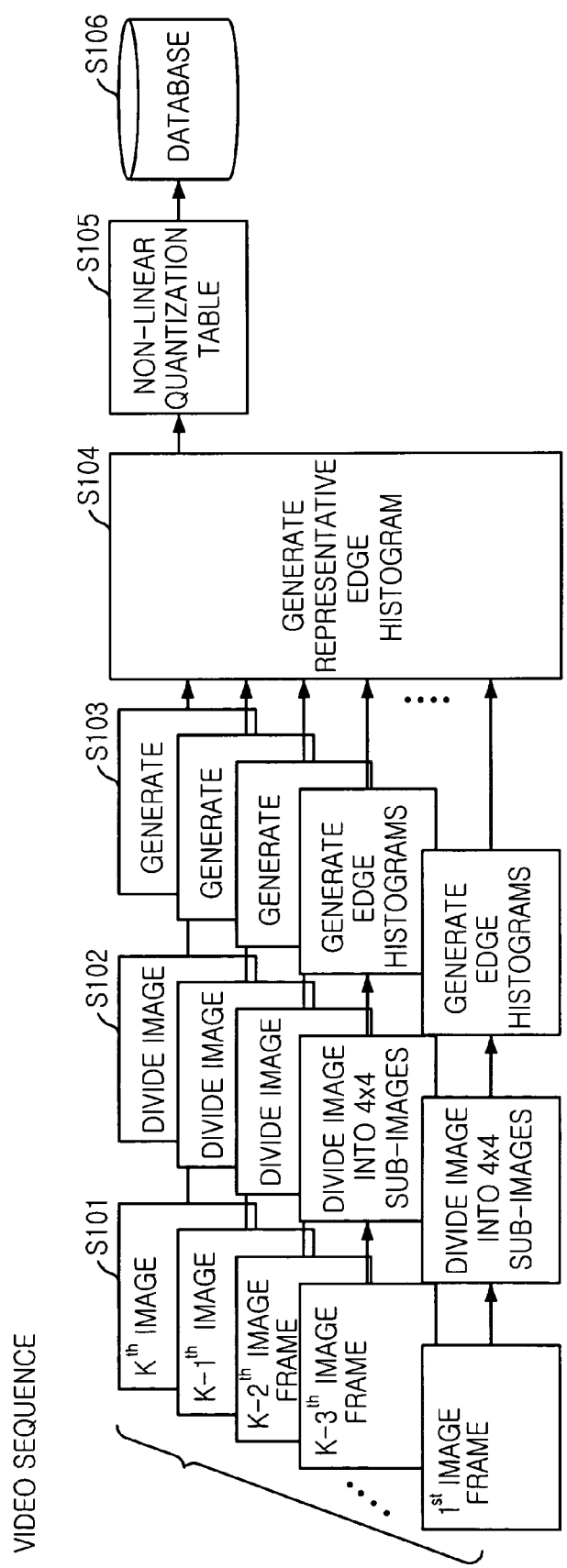
FIG. 1A is a block diagram illustrating a parallel process for constructing a database having a plurality of image descriptors for corresponding video sequences in accordance with one embodiment of the present invention.

Referring to FIG. 1A, there is shown a block diagram illustrating a parallel process for constructing a plurality of image descriptors for corresponding video sequences in accordance with one embodiment of the present invention.

As shown, the target video sequence includes a number of the image frames and edge histograms of each image frame are simultaneously generated.

At the processing block S101, k number of image frames are imputed to a processing block S102. At the processing block S102, each image frame is divided into N×N, e.g., 4×4 sub-images, wherein N is a positive integer. The sub-images for each image frame are then coupled to a processing block S103 for generating edge histograms of each image frame of the video sequence. That is, an edge histogram for each sub-image is obtained by using a multiplicity of edges and then 80 normalized local edge histogram bins for each image frame are coupled to the processing block S104.

At the processing block S104, representative edge histograms of the target video sequence are computed as a first image descriptor by calculating 80 representative edge histogram bins based on 80 normalized edge histogram bins of each image frames in the video sequence.

Each of the representative edge histogram bins may be one of a mean value or a median value of corresponding normalized edge histogram bins of each image frame. Also, each of the representative edge histogram bins may be one of corresponding normalized edge histogram bins of each image frame by selecting an intersection value or a key value among the corresponding normalized edge histogram bins.

In a meantime, after calculating the representative edge histogram, other statistical values representing variation of objects can be also used for retrieving a desired video sequence together with the representative edge histograms. The other statistical value includes a variance representing the difference between two or more image frames.

At the processing block S105, the representative edge histograms are non-linearly quantized to thereby generate a corresponding second image descriptor which is, e.g., a group of quantization index values.

Thereafter, the second image descriptor for the target video sequence is inputted and stored in a database S106. The above process is performed by using a number of video sequence to be stored in the database.

Figure 1B:
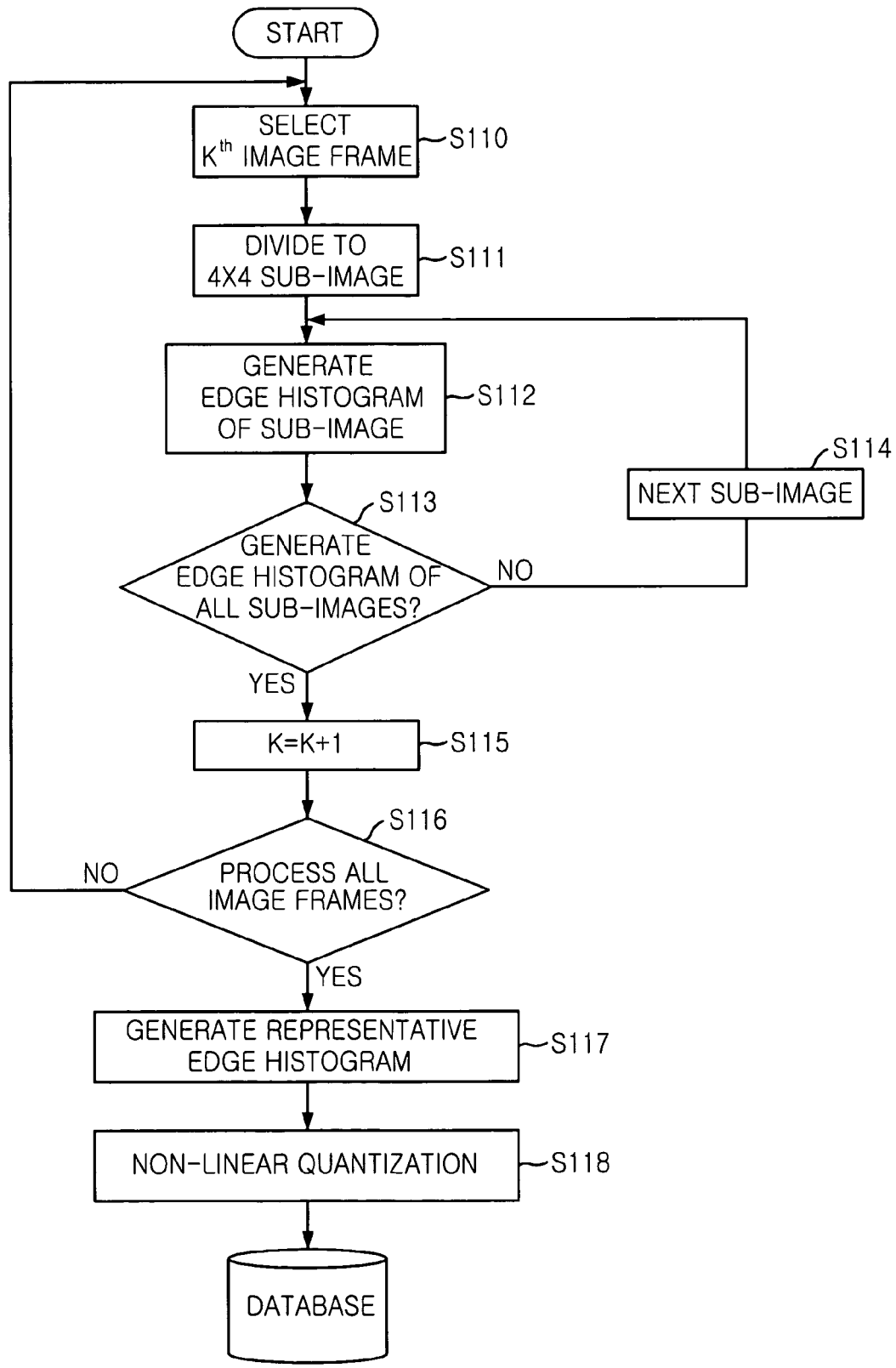
FIG. 1B is a flowchart explaining a serial process for constructing a database having a plurality of image descriptors for corresponding video sequences in accordance with an other embodiment of the present invention.

Referring to FIG. 1B, there is shown a flowchart explaining a serial process for constructing database having a plurality of image descriptors for corresponding video sequences, each video sequence including a set of image frames of digital video data, in accordance with the present invention.

As described hereinbefore, the video sequence includes a number of the image frames and edge histograms of each image frame are serially generated in order to obtain the representative edge histograms.

At step of S110, one of image frames in the video sequence is selected as a target image frame. At step S111, the selected image frame is divided into N×N, e.g., 4×4 sub-images, wherein N is a positive integer. Edge histograms are extracted from the sub-image at step of S112. At step of S113, it is determined whether or not the edge histograms of all sub-images are generated. If the edge histograms of all sub-images are not generated then a next sub-image is selected at step S114 and the edge histogram of the next sub-image is generated at step 112. Otherwise, if the edge histograms of all sub-images are generated then integer number k is increased by one for selecting next image frame in the video sequence at step of S115. After increasing the k, it is determined whether all image frames of the video sequence are selected. If all image frames of the video sequence are not selected then a next image frame is selected as a newly selected target frame to be processed and the above mentioned steps S110 to S115 are repeated. That is, the edge histograms for each sub-image is obtained by using a multiplicity of edges contained in each sub-images and then 80 normalized local edge histogram bins for each image frame.

After generating all edge histograms of all image frames in the video sequence, representative edge histograms are generated as a first image descriptor at step 117 by calculating 80 representative edge histogram bins based on 80 normalized edge histogram bins of each image frames. Each of the representative edge histogram bins may be one of a mean value or a median value of corresponding normalized local edge histogram bins of all image frame. Also, each of the representative edge histogram bins may be one of corresponding normalized local edge histogram bins of all image frames by selecting an intersection value or a key value among the normalized edge histogram bins.

The representative edge histograms are non-linearly quantized to thereby generate a corresponding second image descriptor which is, e.g., a group of quantization index values at step S118. Thereafter, the second image descriptor for the video sequence is inputted and stored in a database. The above process is repeated until all video sequences to be stored in the database are processed.

Figure 1C:
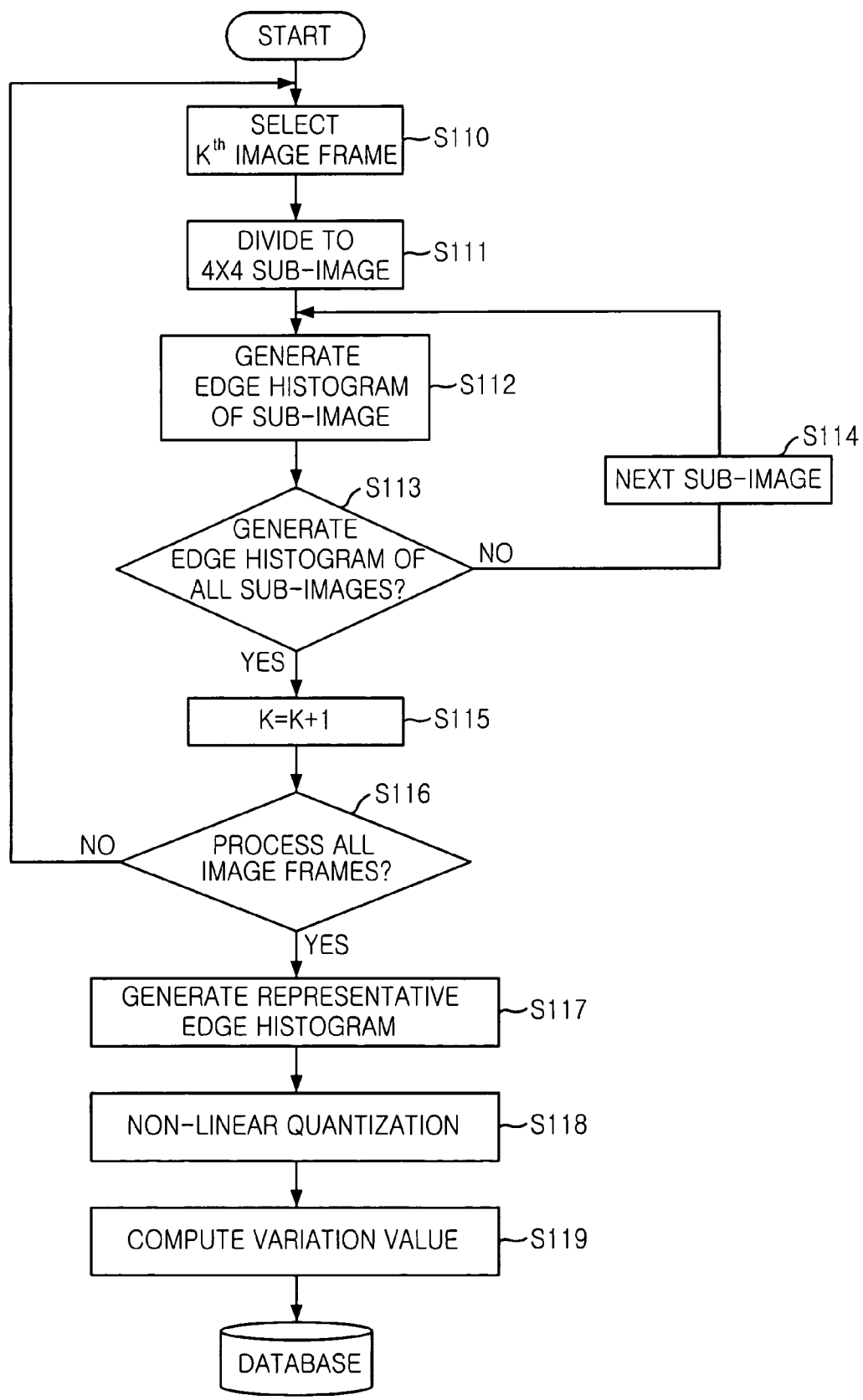
FIG. 1C is a flowchart explaining a serial process for constructing a database having a plurality of image descriptors for corresponding video sequence in accordance with another embodiment of the present invention.

FIG. 1C is a flowchart explaining a serial process for constructing a database having a plurality of image descriptors for corresponding video sequence having image frames of digital video data in accordance with another preferred embodiment of the present invention. Referring to FIG. 1C, the serial process for constructing a database is identical to the flowchart in FIG. 1B except a step 119. Therefore, for the sake of convenience, detailed explanation of steps S110 to S117 is omitted.

After generating the representative edge histogram at step S117, a variation value representing the difference between two or more image frames is computed at step S119. The variation value can be obtained by calculating a variation of the edge histogram of each image frame in the digital video data. The variation values representing variation of objects can be also used for retrieving the desired video sequence. A variance or a standard deviation can be the variation values. Together with the representative edge histograms, the variance may be used for retrieving the digital video data in detail.

Referring to FIGS. 2 to 6, there are shown explanatory diagrams for illustrating a process for obtaining the first image descriptor described referring to FIG. 1.

Figure 2:
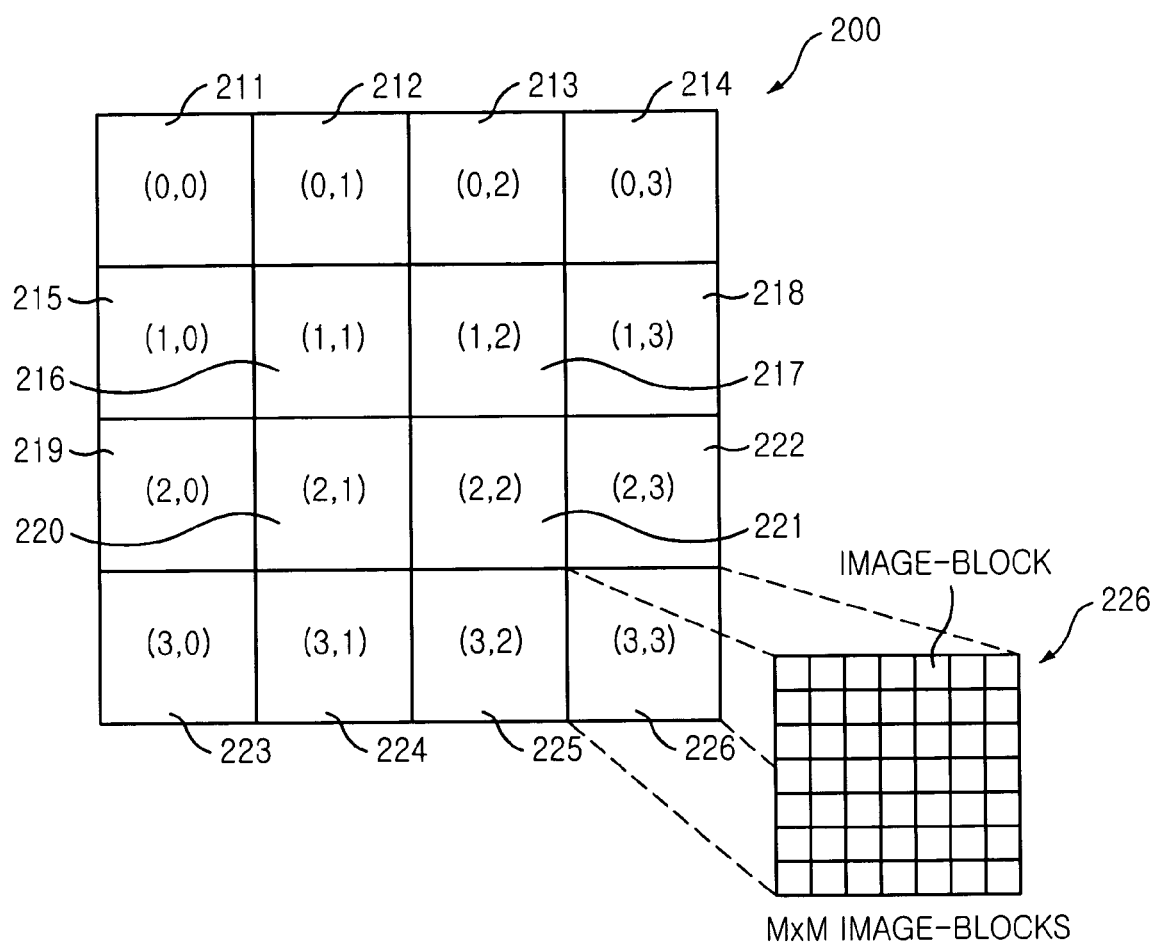
FIG. 2 shows an explanatory diagram depicting an image having 16 sub-images to be represented by image descriptors.
Figure 3A:
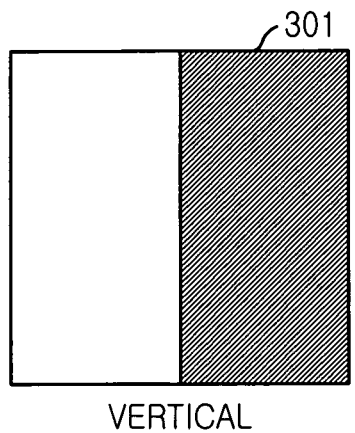
FIGS. 3A to 3E illustrate 5-types of edges to be used for an edge determination process in accordance with the present invention.
Figure 3B:
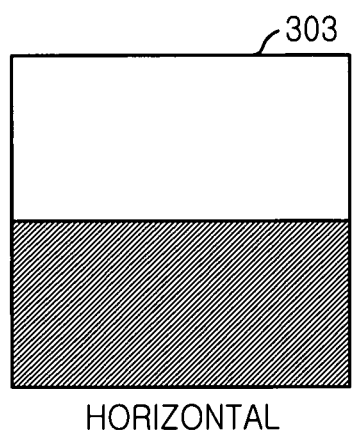
Figure 3C:
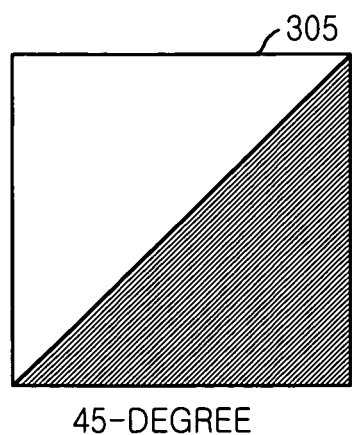
Figure 3D:
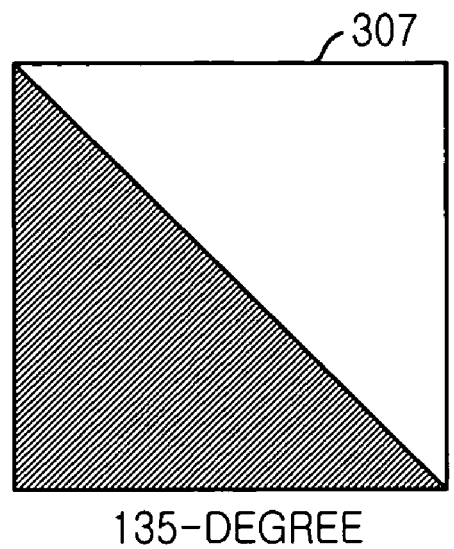
Figure 3E:
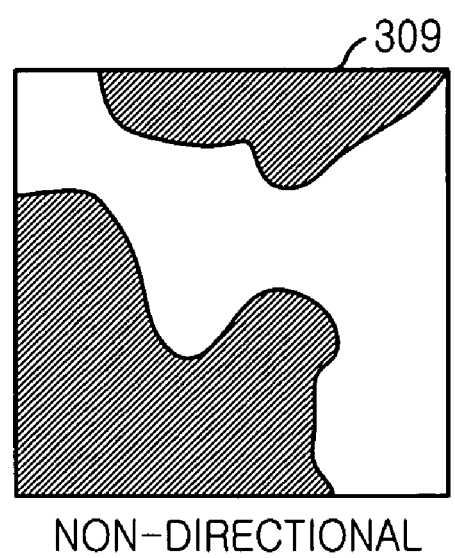

As shown in FIG. 2, in order to obtain a corresponding edge histograms of each image frame in a video sequence, an inputted image frame of digital 200 is divided into 4×4 non-overlapping sub-images to thereby form 16 number of rectangle-shaped sub-images 211 to 226. Each of the sub-images contains a plurality of pixels.

In order to extract the edge histogram, each sub-image is then divided into M×T non-overlapping square-shaped image-blocks wherein the size of the image-block depends on the size of the image. Each image-block is used in an edge determination process, in which an image-block is described by using one of edges.

In accordance with one embodiment of the present invention, as shown in FIGS. 3A to 3E, the edge determination process is provided with five edges, one of which is selected for an image-block. The edges can include various types of directional edges, preferably, vertical, horizontal, 45 degree and 135 degree edges 301 to 307; and a non-directional edge 309 including at least one edge of undesignated direction.

In order to generate an edge histogram for a sub-image, it is necessary to detect an edge feature from an image-block. That is, the edge determination process is performed in order to determine which one of edges can be assigned to an image-block. The extraction can be performed using a method applying digital filters in the spatial domain.

Figure 4:
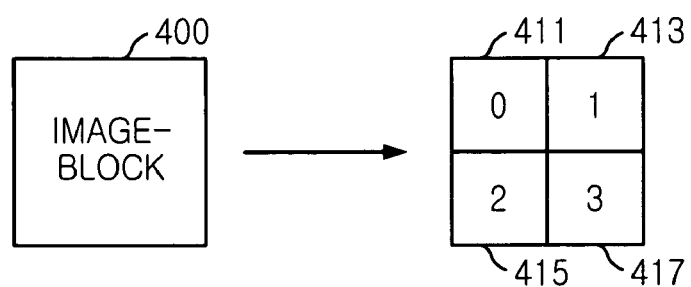
Figure 5A:
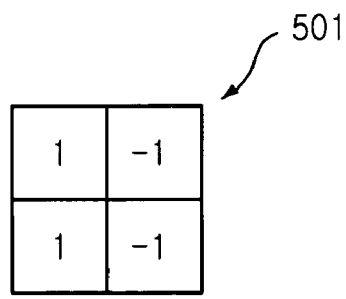
FIGS. 5A to 5E show image-blocks, wherein sub-blocks of each image-block are provided with corresponding filer coefficients for 5 edges.
Figure 5B:
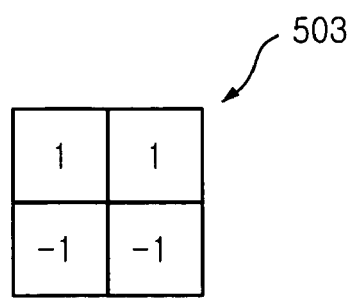
Figure 5C:
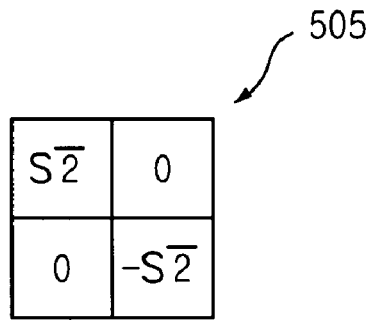
Figure 5D:
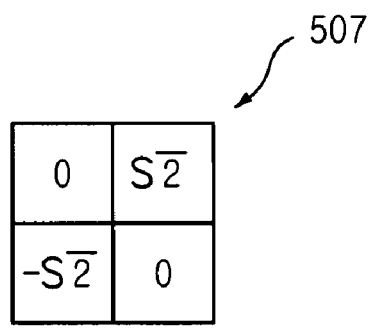
Figure 5E:
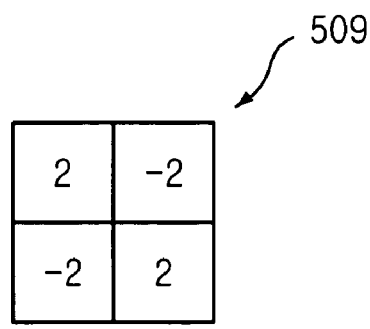

In the edge determination process, as shown in FIG. 4, an image-block is partitioned into 4 sub-blocks. That is, as shown, a reference numeral 400 denotes the image-block and reference numerals 411, 413, 415 and 417 denote sub-blocks, respectively. The sub-blocks are also labeled 0, 1, 2 and 3 for the image-block 400, wherein a corresponding filter coefficient is assigned to each sub-block to be able to obtain a set of edge magnitudes.

In accordance with one embodiment of the present invention, each image-block 400 is partitioned into 2×2 sub-blocks each of which is labeled 0, 1, 2 or 3.

For each image block, a set of five edge magnitudes corresponding to five types of edges are obtained by using following equations:

$$m_v(i, j) = \left| \sum_{k=0}^{3} a_k(i, j) \times f_v(k) \right| \quad \text{Eq. 1}$$

$$m_h(i, j) = \left| \sum_{k=0}^{3} a_k(i, j) \times f_h(k) \right| \quad \text{Eq. 2}$$

$$m_{d-45}(i, j) = \left| \sum_{k=0}^{3} a_k(i, j) \times f_{d-45}(k) \right| \quad \text{Eq. 3}$$

-continued $$m_{d-135}(i, j) = \left| \sum_{k=0}^{3} a_k(i, j) \times f_{d-135}(k) \right|$$ Eq. 4

$$m_{nd}(i, j) = \left| \sum_{k=0}^{3} a_k(i, j) \times f_{nd}(k) \right|$$ Eq. 5 where $m_v(i,j)$, $m_h(i,j)$, $m_{d-45}(i,j)$, $m_{d-135}(i,j)$ and $m_{nd}(i,j)$, respectively, denote vertical, horizontal, 45 degree, 135 degree and non-directional edge magnitudes for a $(i,j)^{th}$ image-block; $a_k(i,j)$ denotes an average gray level for a sub-block labeled k in the $(i,j)^{th}$ image-block and $f_v(k)$, $f_h(k)$, $f_{d-45}(k)$, $f_{d-135}(k)$ and $f_{nd}(k)$ denote, respectively, filter coefficients for the vertical, horizontal, 45 degree, 135 degree and non-directional edges where k=0, 1, 2 and 3, each representing a number labeling each sub-block.

Referring to FIGS. 5A to 5E, there are shown filter coefficients for each edge.

As shown, reference numerals 501, 503, 505, 507 and 509, respectively, show respective filter coefficients for the vertical, horizontal, 45 degree, 135 degree and non-directional edges. Each image-block can be represented by using a selected one among five edge magnitudes, wherein each magnitude is calculated for respective edges.

In order to determine an edge corresponding to an image-block, the five edge magnitudes obtained by using the above equations are compared each other. According to the comparison, the image-block is expressed by one edge having a maximum edge magnitude among them, where the maximum edge magnitude should be also greater than a predetermined threshold value. If the maximum edge magnitude is less than the predetermined threshold value, it is determined that the image-block contains no edge.

When the selected edge for the image-block is determined as a result of the edge magnitude comparison, a corresponding edge histogram bin for the sub-image is increased by 1. There are five types of edge histogram bins, i.e., vertical, horizontal, 45 degree, 135 degree and non-directional edge histogram bins. The five edge histogram bins are components for representing the edge histogram. The detection of corresponding edges for all of the image-blocks included in a sub-image is performed and then an edge histogram bin corresponding to each detected edge is increased by 1 to thereby generate an edge histogram, so called, a local edge histogram, for the sub-image. The detection of edges and generation of edge histogram are performed for all of 16 sub-images.

The local edge histogram represents the distribution of 5 types of edges in a sub-image, i.e., an edge histogram for a sub-image. Since the number of sub-images is fixed to 16 and each sub-image is assigned 5 edge histogram bins, 80 edge histogram bins are needed to generate corresponding local edge histograms for all of 16 sub-images. That is, semantics of each bin of BinCounts is defined as shown in following Table 1:

TABLE 1

| Edge histogram bin | Semantics |
| --- | --- |
| BinCounts[0] | Vertical edges in sub-image (0, 0) |
| BinCounts[1] | Horizontal edges in sub-image (0, 0) |
| BinCounts[2] | 45 degree edges in sub-image (0, 0) |
| BinCounts[3] | 135 degree edges in sub-image (0, 0) |
| BinCounts[4] | Non-directional edges in sub-image (0, 0) |

TABLE 1-continued

| Edge histogram bin | Semantics |
| --- | --- |
| BinCounts[5] | Vertical edges in sub-image (0, 1) |
| . | . |
| . | . |
| BinCounts[74] | Non-directional edges in sub-image (3, 2) |
| BinCounts[75] | Vertical edges in sub-image (3, 3) |
| BinCounts[76] | Horizontal edges in sub-image (3, 3) |
| BinCounts[77] | 45 degree edges in sub-image (3, 3) |
| BinCounts[78] | 135 degree edges in sub-image (3, 3) |
| BinCounts[79] | Non-directional edges in sub-image (3, 3) | where BinCount[0], BinCount[1] . . . BinCount[79] represent coded bits for the edge histogram descriptor.

Figure 6:
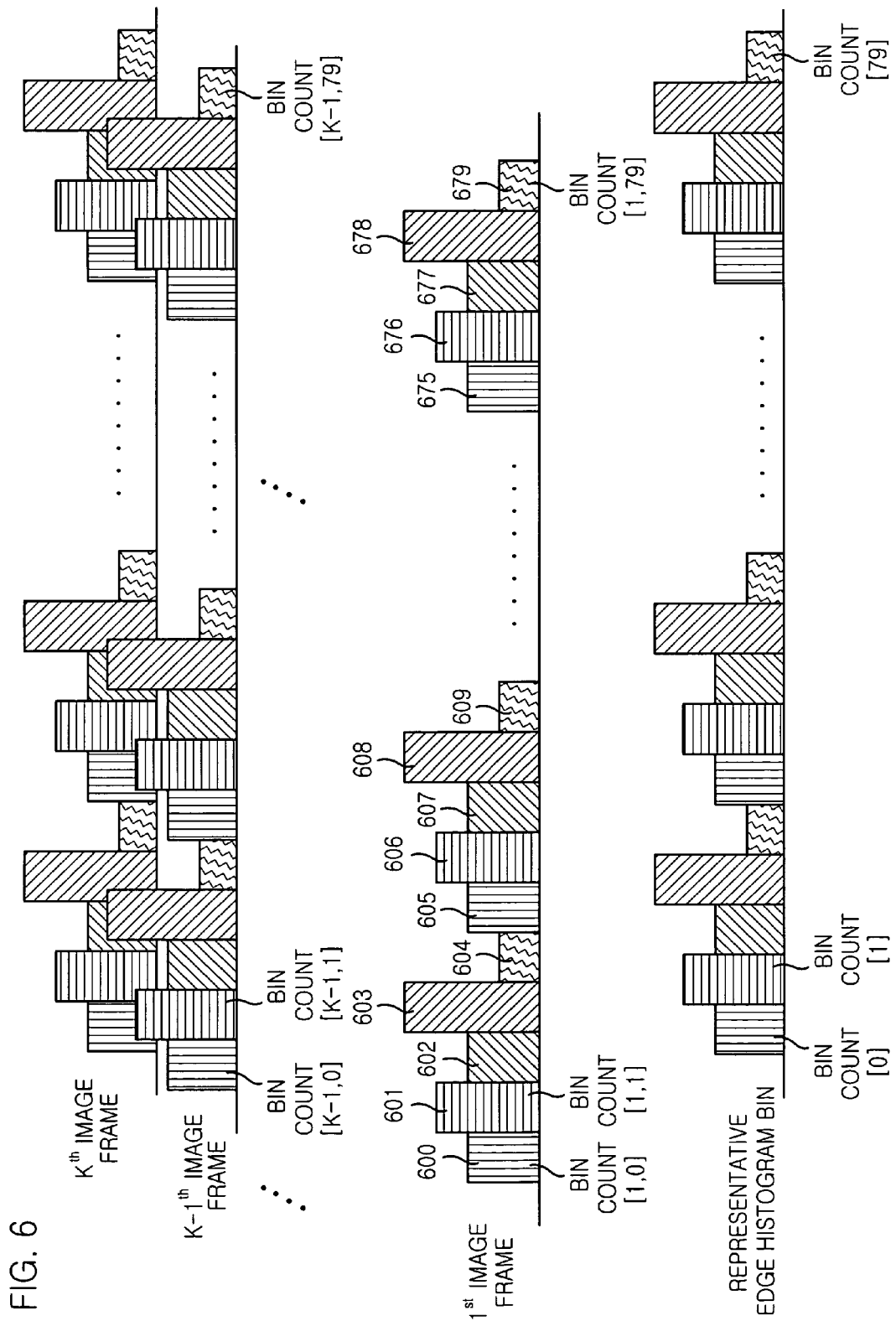
FIG. 6 is an explanatory diagram illustrating an array of 80 edge histogram bins corresponding to each image frame.

Referring to FIG. 6, there is shown exemplary arrays of 80 edge histogram bins corresponding to each image frame in a video sequence.

For example, a edge histogram for a sub-image 211 at (0,0) of the image 200 shown in FIG. 2 includes vertical, horizontal, 45 degree, 135 degree and non-directional edge histogram bins 600, 601, 602, 603 and 604 of $1^{st}$ image frame (which is referred to BIN COUNT[1.0], BIN COUNT[1.1], BIN COUNT[1.3] (not shown) and BIN COUNT[1.4] (not shown) as shown in FIG. 6). In the same way, a local edge histogram for a sub-image 212 at (0,1) in FIG. 2 includes 5 edge histogram bins 605, 606, 607, 608 and 609 (which is also referred to BIN COUNT[1.5], BIN COUNT[1.6], BIN COUNT[1.7] and BIN COUNT[1.9] (not shown)) in the same sequence as that of bins for the sub-image 211. Consequently, total 80 edge histogram bins are needed to generate respective 16 edge histograms for all of the 16 sub-images, wherein the total 80 bins are calculated by multiplying 5 edge histogram bins by 16 sub-images.

In order to obtain edge histograms of each image frame of the video sequence, each edge histogram bin in a local edge histogram for a sub-image is normalized by dividing each bin by the total number of the image-blocks included in the sub-image. Thereby, each edge histogram bin for the local edge histogram has a bin value ranging from 0 to 1.

After computing all of edge histograms of each image frame in the digital video data, representative edge histograms of the video sequence are computed as a first image descriptor by calculating 80 representative edge histogram bins based on 80 normalized local edge histogram bins of image frame in the video sequence.

Each of the representative edge histogram bins may be one of a mean value or a median value of corresponding normalized edge histogram bins in all image frames. Also, each of the representative edge histogram bins may be one of corresponding normalized edge histogram bins of all image frames by selecting an intersection value or a key value among the local edge histogram bins located at the same position.

For example, if the mean value is used for calculating the representative edge histograms, then the representative edge histograms are calculated as following. Referring to FIG. 6, corresponding edge histogram bins located at the same position for each image frame are added and divided by the number of frame in the video sequence to generate representative edge histograms. For example, corresponding edge histogram bins BIN COUNT [k.0], BIN COUNT[k−1,0], . . . BIN COUNT[1.0] are added and divided by the number of frame to generate the representative edge histogram bin BIN COUNT[0]. All other edge histogram bins are also added and divided by the number of frame in the digital video data to generate the representative edge histogram bins such as BIN COUNT[0], BIN COUNT[1] . . . BIN COUNT[79]. After calculating all representative edge histogram bins, the representative edge histograms of the video sequence are stored as the first image descriptor of the video sequence as mentioned above.

The normalized bin values of representative edge histogram in the digital video data are then coupled to the processing block S105 shown in FIG. 1A as the representative histogram bins. At the processing block S105, the representative histogram is non-linearly quantized by using a number of quantization tables.

That is, in order to obtain a second image descriptor, the normalized bin values are quantized for obtaining binary representations thereof. The quantization should be performed for the normalized 80 bin values of the representative edge histograms. In this case, the normalized bin values are non-linearly quantized to be able to minimize overall number of bits for the binary representations. The above process is performed for all video sequence to be stored in a database.

As a result, a group of quantization index values is obtained as the second image descriptor. The non-linear quantization is performed using a non-linear quantizer designed with, e.g., a Lloyd-Max algorithm in accordance with one embodiment of the present invention.

In order to perform the quantization, five non-linear quantization tables for each of vertical edge, horizontal edge, 45 degree edge, 135 degree edge and non-directional edge histogram bins are used therein, which can be represented as following listed Tables 2 to 6:

TABLE 2 quantization table for the vertical edge histogram bin

| Index(3 bits/bin) | Range | Representative value |
|---|---|---|
| 0 | 0.0000000~0.0343910 | 0.010867 |
| 1 | 0.0343910~0.0787205 | 0.057915 |
| 2 | 0.0787205~0.1221875 | 0.099526 |
| 3 | 0.1221875~0.1702110 | 0.144849 |
| 4 | 0.1702110~0.2280385 | 0.195573 |
| 5 | 0.2280385~0.3092675 | 0.260504 |
| 6 | 0.3092675~0.4440795 | 0.358031 |
| 7 | 0.4440795~1.0000000 | 0.530128 |

TABLE 3 quantization table for the horizontal edge histogram bin

| Index(3 bits/bin) | Range | Representative value |
|---|---|---|
| 0 | 0.0000000~0.0411000 | 0.012266 |
| 1 | 0.0411000~0.0979065 | 0.069934 |
| 2 | 0.0979065~0.1540930 | 0.125879 |
| 3 | 0.1540930~0.2128515 | 0.182307 |
| 4 | 0.2128515~0.2789795 | 0.243396 |
| 5 | 0.2789795~0.3631455 | 0.314563 |
| 6 | 0.3631455~0.4880235 | 0.411728 |
| 7 | 0.4880235~1.0000000 | 0.564319 |

TABLE 4 quantization table for the 45 degree edge histogram bin

| Index(3 bits/bin) | Range | Representative value |
|---|---|---|
| 0 | 0.0000000~0.0150225 | 0.004193 |
| 1 | 0.0150255~0.0363560 | 0.025852 |
| 2 | 0.0363560~0.0576895 | 0.046860 |
| 3 | 0.0576895~0.0809025 | 0.068519 |
| 4 | 0.0809025~0.1083880 | 0.093286 |
| 5 | 0.1083880~0.1424975 | 0.123490 |
| 6 | 0.1424975~0.1952325 | 0.161505 |
| 7 | 0.1952325~1.0000000 | 0.228960 |

TABLE 5 quantization table for the 135 degree edge histogram bin

| Index(3 bits/bin) | Range | Representative value |
|---|---|---|
| 0 | 0.0000000~0.0150490 | 0.004174 |
| 1 | 0.0150490~0.0360780 | 0.025924 |
| 2 | 0.0360780~0.0566975 | 0.046232 |
| 3 | 0.0566975~0.0784090 | 0.067163 |
| 4 | 0.0784090~0.1025230 | 0.089655 |
| 5 | 0.1025230~0.1336475 | 0.115391 |
| 6 | 0.1336475~0.1848245 | 0.151904 |
| 7 | 0.1848245~1.0000000 | 0.217745 |

TABLE 6 quantization table for the non-directional edge histogram bin

| Index(3 bits/bin) | Range | Representative value |
|---|---|---|
| 0 | 0.0000000~0.0292225 | 0.006778 |
| 1 | 0.0292225~0.0801585 | 0.051667 |
| 2 | 0.0801585~0.1374535 | 0.108650 |
| 3 | 0.1374535~0.1952415 | 0.166257 |
| 4 | 0.1952415~0.2549585 | 0.224226 |
| 5 | 0.2549585~0.3210330 | 0.285691 |
| 6 | 0.3210330~0.4036735 | 0.356375 |
| 7 | 0.4036735~1.0000000 | 0.450972 | where the optimal number of bits per bin is fixed to 3 in order to have 8 quantization levels in the above quantization tables in accordance with present invention. The second image descriptor is then stored in the database S106 and will be retrieved in response to an input of a query image.

Figure 7:
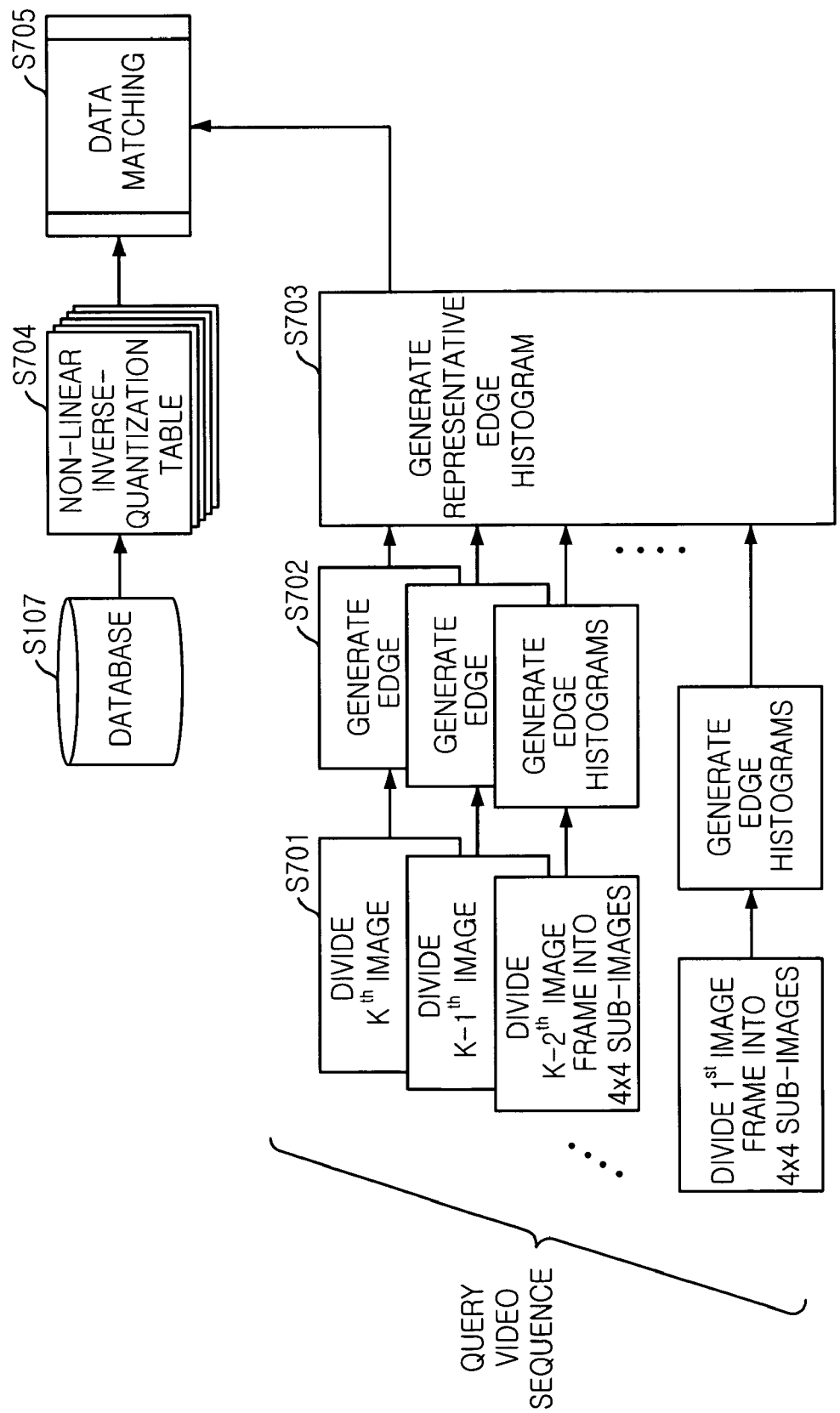
FIG. 7 is a diagram showing a process for retrieving a desired video sequence in response to an input of query video sequence in accordance with the present invention.

FIG. 7 is a diagram illustrating a method for retrieving a desired video sequence in response to an input of query video sequence in accordance with a preferred embodiment of the present invention.

If a query video sequence is received, the query video sequence is processed in the same manner of the processing blocks S101 and S103 shown in FIG. 1A. That is, edge histograms of each image frame for the query video sequence are obtained by using the above same manner and includes normalized edge histogram bins for the query video sequence.

Thereafter, local edge histograms of each image frame in the video sequence, representative edge histograms of the video sequence, global edge histogram and semi-global histograms for the query video sequence are generated based on the normalized edge histogram bins as an image descriptor.

The global edge histogram represents the edge distribution for the whole image space. The global edge histogram and the semi-global histograms will be described hereinafter in more detail.

On the other hand, referring to FIG. 7, there is shown a method for retrieving a desired digital video data in response to an input of a query video sequence by using a number of non-linear inverse quantization tables in accordance with a preferred embodiment of the present invention, wherein the non-linear inverse tables can be of Tables 2, 3, 4, 5 and 6 as described above.

When a query video sequence is inputted, the same process as that in the processing block S11, i.e., the image division process is performed at a processing block S701.

At a processing block S702, the same process as that in the processing block S103, i.e., the edge histogram generation of each image frame is performed.

At a processing block S703, the representative edge histogram of the video sequence is generated according to the edge histograms of each image frame in the video sequence.

After the calculating the representative edge histograms of the video sequence, a non-linear quantization process is performed same as processing block S105 in FIG. 1A.

In order to achieve a high retrieval performance, a global edge histogram and semi-global edge histograms for the query video sequence can be further generated after non-linear inverse quantization process of the representative edge histogram S704, based on the representative edge histogram bins that are generated at the processing block S703.

For a data matching process, a number of second image descriptors for each video sequence are retrieved sequentially from the pre-established database S107. For a stored target video sequence, a group of quantization index values are retrieved and coupled to the non-linear inverse-quantization tables S704. Through the use of the non-linear inverse-quantization tables, the quantization index values are then converted into normalized edge histogram bins for the retrieved video sequence.

At a processing block S705, the representative edge histograms of the query video sequence and the retrieved video sequence is compared for selecting a desired video sequence.

For minutely matching the retrieved video sequence and the query video sequence, a global edge histogram and semi-global edge histograms can be used. For example, the data matching process block S705 is explained by using the global edge histogram and the semi-global edge histograms.

The normalized edge histogram bins are used in extracting representative edge histograms of video sequence, a global edge histogram and semi-global edge histograms for the retrieved video sequence. That is, in order to achieve a high retrieval performance, the representative edge histograms having the normalized representative edge histogram bins, the global edge histogram and the semi-global edge histograms are used in the data matching process as an image descriptor for a retrieved video sequence.

U.S. patent application Ser. No. 09/978,668, filed on Oct. 18th, 2001, entitled "NON-LINEAR QUANTIZATION AND SIMILARITY MATCHING METHOD FOR RETRIEVING IMAGE DATA", commonly owned by the same assignee of this invention, the disclosure of which is incorporated by reference herein, describes generation of global edge histogram and the semi-global edge histograms in detail.

In the data matching process S705, by calculating a distance between the representative, semi-global and global edge histograms of the query video sequence A and the target video sequence B, a similarity between the two videos is determined as follows:

$$\text{Distance}(A, B) = \sum_{i=0}^{79} |\text{Local\_A}[i] - \text{Local\_B}[i]| + \\ 5 \times \sum_{i=0}^{4} |\text{Global\_A}[i] - \text{Global\_B}[i]| + \\ \sum_{i=0}^{64} |\text{Semi\_Global\_A}[i] - \text{Semi\_Global\_B}[i]| \qquad \text{Eq. 6}$$

where Local_A[i] and Local_B[i] denote, respectively, index values assigned to $i^{th}$ bins of each of representative edge histograms of the video sequences A and B; Global_A[ ] and Global_B[ ] denote, respectively, index values assigned to $i^{th}$ bins of each of global edge histograms of the digital video datas A and B; and Semi_Global_A[ ] and Semi_Global_B[ ] denote, respectively, index values assigned to $i^{th}$ bins of each of semi-global edge histograms of the video sequences A and B. Since the number of bins for the global edge histogram is relatively smaller than that of the representative and semi-global edge histograms, a weighting factor of 5 is applied in the above equation.

As explained above, using the equation 6, the similarity between the two digital video data A and B can be measured by referring to the inverse quantization tables. In this case, since representative edge histogram bin values for the image should be decoded by referring to the inverse quantization tables, the equation 6 is generally used in applications for complicated but accurate retrieval. Herein, each of the inverse quantization tables is corresponding to each of edge quantization tables shown in Tables 2 to 6.

The above procedure is then repeated until all of the video sequence are processed.

In accordance with the present invention, the number of bits necessary for storing the quantization index values for a video sequence having a plurality of image frames can be greatly reduced. Furthermore, a complexity of the similarity calculation can be significantly decreased by using the non-linear quantizer.

Moreover, the present invention can be effectively retrieving digital video data including the texture video by using the edge histogram descriptor.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for retrieving a corresponding video sequence having a set of image frames of digital video data from a database in response to a query video sequence, the method comprising the steps of:
   a) calculating, by a computer, L representative edge histograms of the query video sequence as an image descriptor for the query video sequence, wherein each representative edge histogram represents a representative spatial distribution of 5 reference edges in sub-images of image frames in the query video sequence, wherein the reference edges includes 4 directional edges and a non-directional edge;
   b) extracting, by the computer, a plurality of image descriptors for video sequences based on digital video data information from the database, wherein each image descriptor for said each video sequence includes L representative edge histogram bins for said each video sequence;

c) comparing, by the computer, the image descriptor for the query video sequence to said each image descriptor for each video sequences to generate a comparison result, the comparison result indicating a degree of similarity between the query video sequence and the video sequences; and d) retrieving, by the computer, at least one video sequence based on the comparison results, wherein the step b) includes the steps of:

b1) retrieving L×5 quantization index values for each of the target video sequence;

b2) converting each of the L×5 quantization index values into L×5 representative edge histogram bins for said each target video sequence by using 5 non-linear inverse quantization tables; and b3) generating L representative edge histograms based on the L×5 normalized edge histogram bins.

2. The method as recited in claim 1, wherein said each edge histogram has 5 edge histogram bins corresponding to the reference edges.

3. The method as recited in claim 1, wherein the directional edges include a vertical edge, a horizontal edge, a 45 degree edge, a 135 degree edge and the non-directional edge represents an edge of undesignated direction except for the 4 directional edges.

4. The method as recited in claim 3, wherein the step a2) includes the steps of:

a2-1) assigning one of the reference edges to each image block; and a2-2) counting the number of each reference edge included in each sub-image to generate the L number of the edge histograms for the query video sequence.

5. The method as recited in claim 4, wherein the step a2-1) includes the steps of:

a2-11) dividing each image-block into 2×2 sub-blocks;

a2-12) assigning a corresponding filter coefficient to each sub-block;

a2-13) calculating a set of 5 edge magnitudes corresponding to five edges for each image-block by using the filter coefficient; and a2-14) expressing the image-block as an edge having a maximum edge magnitude by comparing the calculated edge magnitudes each other.

6. The method as recited in claim 5, wherein the 5 edge magnitude are obtained by using 5 equations, which are expressed as:

$$m_v(i,j) = \left|\sum_{k=0}^{3} a_k(i,j) \times f_v(k)\right|;$$

$$m_h(i,j) = \left|\sum_{k=0}^{3} a_k(i,j) \times f_h(k)\right|;$$

$$m_{d-45}(i,j) = \left|\sum_{k=0}^{3} a_k(i,j) \times f_{d-45}(k)\right|;$$

$$m_{d-135}(i,j) = \left|\sum_{k=0}^{3} a_k(i,j) \times f_{d-135}(k)\right|; \text{ and}$$

-continued $$m_{nd}(i,j) = \left|\sum_{k=0}^{3} a_k(i,j) \times f_{nd}(k)\right|, \text{ where } m_v(i,j), m_h(i,j), m_{d-45}(i,j),$$

respectively, denote vertical, horizontal, 45 degree, 135 degree and non-directional edge magnitudes for a $(i,j)^{th}$ image-block; $a_k(i,j)$ denotes an average gray level for a sub-block assigned k in the $(i,j)^{th}$ image-block and $f_v(k)$, $f_h(k)$, $f_{d-45}(k)$, $f_{d-135}(k)$ and $f_{nd}(k)$ denote, respectively, filter coefficients for the vertical, horizontal, 45 degree, 135 degree and non-directional edges where k represents a number assigned to each sub-block.

7. The method as recited in claim 5, wherein the maximum edge magnitude is greater than a predetermined threshold value, otherwise the image block is considered to contain no edge.

8. The method as recited in claim 1, wherein the step a) includes steps of:

a1) partitioning each image frame of query video sequence into L sub images, wherein each sub-image is further partitioned into S×T image-blocks, L, S and T being positive integers;

a2) assigning one of 5 reference edges to each image-block to thereby generate L edge histograms for each image frame, wherein the edge histograms include M edge histogram bins and the reference edges include 4 directional edges and a non-directional edge;

a3) normalizing the edge histogram bins contained in each edge histogram by S×T to thereby generate M normalized edge histogram bins for said each image frame;

a4) calculating M representative edge histogram bins of said query video sequence in order to generate L representative edge histograms of each video sequence based on the normalized edge histogram bins of said each image frames.

9. The method as recited in claim 1, wherein the image descriptors for the query video sequence and target video sequence further include a global edge histogram and R the semi-global histograms based on the L×5 representative edge histogram bins, respectively, R being a positive integer.

10. The method as recited in claim 9, wherein the global edge histogram represents an edge distribution in a whole space of the query and target video sequences and each semi-global edge histogram represents an edge distribution in a corresponding set of sub-images of the query and target video sequences.

11. The method as recited in claim 9, wherein said N and R are 4 and 13, respectively.

12. The method as recited in claim 11, wherein each of the 13 semi-global edge histograms is generated for each of 13 sets of 4 sub-images, wherein the 13 sets include: four sets of 4 sub-images, each set including 4 sub-images in each of first to fourth columns of the image in vertical direction; four sets of 4 sub-images, each set including 4 sub-images in each of first to fourth rows in horizontal direction; four sets of 4 sub-images, each set including a corresponding sub-image and 3 sub-images neighboring the corresponding sub-image, wherein the corresponding sub-image is respectively located on the left-top, on the right-top, on the left-bottom and on the right-bottom of the image; and a set including 4 sub-images around the center of the image.

13. The method as recited in claim 1, wherein the step b) further includes the step of: b4) further generating a global edge histogram and R semi-global histograms for each of the target video sequence based on the L×5 representative edge histogram bins.

14. The method as recited in claim 13, wherein the step c) includes the step of:

estimating a distance between the query video sequence and said each target video sequence by equation as:

| Index | Range | Representative value |
|---|---|---|
| 0 | 0.0000000~0.0343910 | 0.010867 |
| 1 | 0.0343910~0.0787205 | 0.057915 |
| 2 | 0.0787205~0.1221875 | 0.099526 |
| 3 | 0.1221875~0.1702110 | 0.144849 |
| 4 | 0.1702110~0.2280385 | 0.195573 |
| 5 | 0.2280385~0.3092675 | 0.260504 |
| 6 | 0.3092675~0.4440795 | 0.358031 |
| 7 | 0.4440795~1.0000000 | 0.530128 | where Local_A[i] and Local_B[i] denote, respectively, the edge histogram bins of BinCount[i] of the query video sequence A and the target video sequence B; Global_A[ ] and Global_B[ ] denote, respectively, the edge histogram bins for the global edge histograms of the query image A and the target image B; and Semi_Global_A[ ] and Semi_Global_B[ ] denote, respectively, the histogram bin values for the semi-global edge histogram bins of the query video sequence A and the target video sequence B.

15. The method as recited in claim 1, wherein the step b) includes the steps of:

b1) retrieving L×5 quantization index values for each of the target video sequence;

b2) converting each of the L×5 quantization index values into L×5 representative edge histogram bins for said each target video sequence by normalizing the L×5 quantization index values; and b3) generating L representative histograms based on the L×5 representative edge histogram bins.

16. The method as recited in claim 15, wherein the step b) further includes the step of: b4) further generating a global edge histogram and R semi-global histograms for each of the target images based on the L×5 normalized edge histogram bins.

17. The method as recited in claim 16, wherein the step c) includes the step of:

estimating a distance between the query video sequence and said each target video sequence by equation as:

$$\text{Distance}(A, B) = \sum_{i=0}^{79} |\text{Local\_A}[i] - \text{Local\_B}[i]| + 5 \times \sum_{i=0}^{4} |\text{Global\_A}[i] - \text{Global\_B}[i]| + \sum_{i=0}^{64} |\text{Semi\_Global\_A}[i] - \text{Semi\_Global\_B}[i]|$$

where Local_A[i] and Local_B[i] denote, respectively, the edge histogram bins of BinCount[i] of the query video sequence A and the target video sequence B; Global_A[ ] and Global_B[ ] denote, respectively, the edge histogram bins for the global edge histograms of the query image A and the target image B; and Semi_Global_A[ ] and Semi_Global_B[ ] denote, respectively, the histogram bin values for the semi-global edge histogram bins of the query video sequence A and the target video sequence B.

* * * * *